US012794331B2

(12) United States Patent
Sano et al.

(10) Patent No.: US 12,794,331 B2
(45) Date of Patent: Nov. 10, 2026

(54) VIBRATION MOTOR

(71) Applicant: NIDEC PRECISION CORPORATION, Tokyo (JP)

(72) Inventors: Yoshiyuki Sano, Tokyo (JP); Kyosuke Yokoyama, Tokyo (JP)

(73) Assignee: NIDEC PRECISION CORPORATION, Tokyo (JP)

( * ) Notice: Subject to any disclaimer, the term of this patent is extended or adjusted under 35 U.S.C. 154(b) by 188 days.

(21) Appl. No.: 18/767,987

(22) Filed: Jul. 10, 2024

(65) Prior Publication Data

US 2025/0030326 A1 Jan. 23, 2025

(30) Foreign Application Priority Data

Jul. 19, 2023 (JP) ................................ 2023-117404

(51) Int. Cl.
*H02K 33/00* (2006.01)
*H02K 33/02* (2006.01)

(52) U.S. Cl.
CPC ............ *H02K 33/02* (2013.01); *H02K 33/00* (2013.01)

(58) Field of Classification Search
CPC ........ H02K 33/00; H02K 33/02; H02K 33/16; H02K 33/04; H02K 33/06; H02K 33/08; H02K 33/10; H02K 33/12; H02K 33/14; H02K 33/18; H02K 1/34
USPC ............................... 310/12.01, 12.21, 12.24
See application file for complete search history.

(56) References Cited

U.S. PATENT DOCUMENTS

| | | | | |
|---|---|---|---|---|
| 8,334,624 | B2 | 12/2012 | Dong et al. | |
| 10,847,296 | B2 | 11/2020 | Wauke | |
| 2019/0052160 | A1* | 2/2019 | Oi | H02K 33/02 |
| 2022/0103053 | A1* | 3/2022 | Ho | G02B 27/646 |

FOREIGN PATENT DOCUMENTS

| | | | | |
|---|---|---|---|---|
| JP | 2014091066 | A | 5/2014 | |
| JP | 2016096677 | A | 5/2016 | |
| JP | 2018029480 | A | 2/2018 | |
| JP | 2018029481 | A | 2/2018 | |
| JP | 2018029482 | A | 2/2018 | |
| JP | 2018029483 | A | 2/2018 | |
| JP | 2018029484 | A | 2/2018 | |
| JP | 2018047464 | A | 3/2018 | |
| JP | 2019176688 | A | 10/2019 | |
| WO | 2019021969 | A1 | 1/2019 | |
| WO | WO-2021168940 | A1 * | 9/2021 | H02K 33/02 |

OTHER PUBLICATIONS

Mao Lubin, Linear Vibration Motor, Sep. 2, 2021, WO 2021168940 (English Machine Translation) (Year: 2021).*

* cited by examiner

*Primary Examiner* — Alexander A Singh
(74) *Attorney, Agent, or Firm* — HAUPTMAN HAM, LLP

(57) ABSTRACT

A vibration motor includes a housing, a vibrator accommodated in the housing to reciprocate in a lateral direction inside the housing, and a pair of elastic members supporting the vibrator inside the housing to allow reciprocation of the vibrator in the lateral direction. Each of the pair of elastic members is a metal plate including a first fixture fixed to the vibrator and a second fixture fixed to the housing. The first fixture and the second fixture are bent in a same direction and face each other in a font-rear direction. The first fixture and the second fixture include a pair of bends extending inward. The pair of bends face each other in a vertical direction.

4 Claims, 9 Drawing Sheets

B-B

VIBRATION MOTOR

RELATED APPLICATIONS

The present application claims priority to Japanese Application Number 2023-117404, filed Jul. 19, 2023, the disclosure of which is hereby incorporated by reference herein in its entirety.

BACKGROUND

Technical Field

The present invention relates to a vibration motor.

Description of the Background

Nowadays, various electronic devices such as smartphones and tablet terminals incorporate vibration motors. An example of such vibration motors incorporated in electronic devices is described in Patent Literature 1. The vibration motor described in Patent Literature 1 is a linear vibration motor with a vibrator that vibrates linearly. The vibrator in the vibration motor described in Patent Literature 1 is accommodated in a housing and supported by elastic members to allow vibration.

CITATION LIST

Patent Literature

Patent Literature 1: Japanese Unexamined Patent Application Publication No. 2019-176688

BRIEF SUMMARY

To increase the reliability of a vibration motor, elastic members are to have higher durability.

A vibration motor according to one embodiment includes a housing, a vibrator accommodated in the housing to reciprocate in a first direction inside the housing, and a pair of elastic members supporting the vibrator inside the housing to allow reciprocation of the vibrator in the first direction. Each of the pair of elastic members is a metal plate including a first fixture fixed to the vibrator, a second fixture fixed to the housing, and an intermediate portion connecting the first fixture and the second fixture. The first fixture and the second fixture are bent in a same direction with respect to the intermediate portion and face each other in a second direction perpendicular to the first direction. At least one of the first fixture or the second fixture includes a pair of bends extending in one of two opposite directions of the second direction. The pair of bends face each other in a third direction perpendicular to the first direction and the second direction.

The vibration motor according to the above embodiment of the present invention includes the elastic members with higher durability and thus has higher reliability.

DETAILED DESCRIPTION

Figure 1:
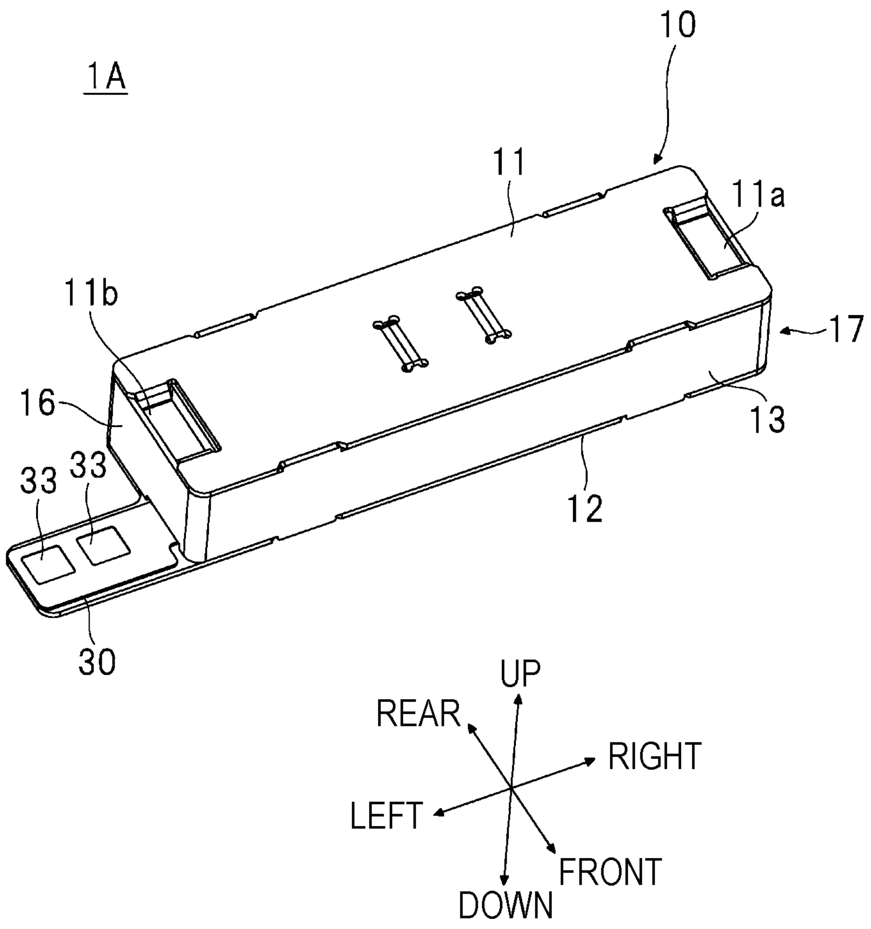
FIG. 1 is an external perspective view of a vibration motor.

One embodiment will now be described in detail with reference to the drawings. In the drawings used to describe the embodiment, the same reference numerals denote the same or substantially the same components or elements. The components or elements described once will not basically be described repeatedly.

Overview of Vibration Motor

Figure 2:
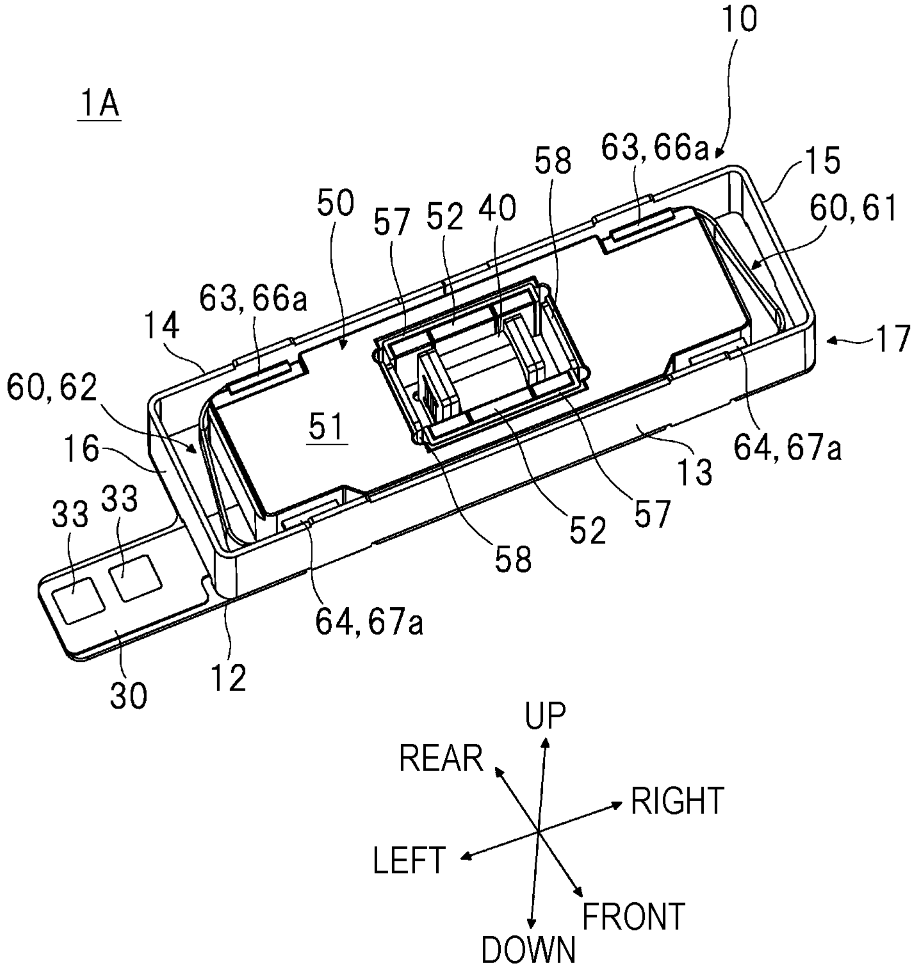
FIG. 2 is a perspective view of the vibration motor.
Figure 3:
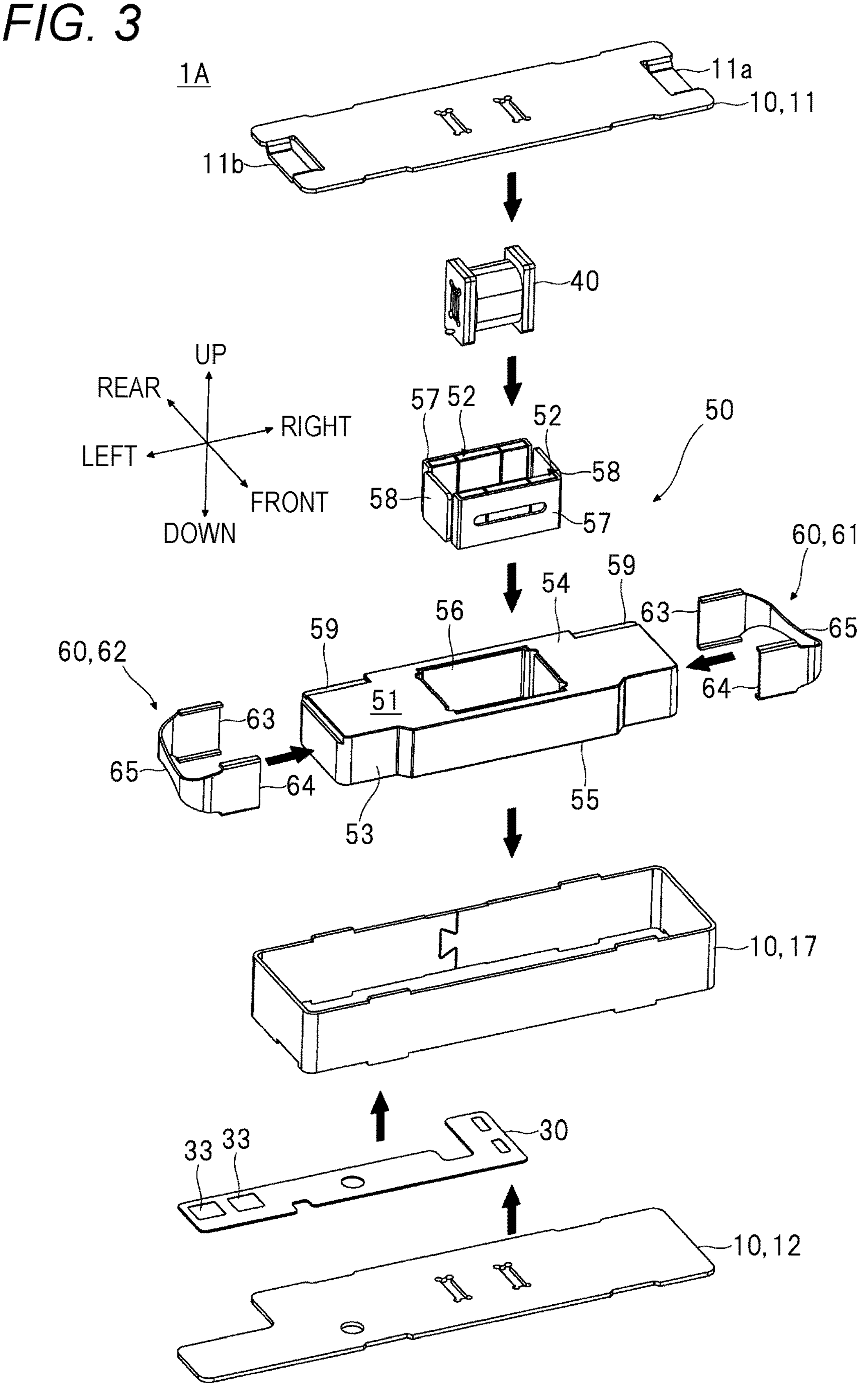
FIG. 3 is an exploded perspective view of the vibration motor.

FIG. 1 is an external perspective view of a vibration motor 1A according to the present embodiment. FIG. 2 is a perspective view of the vibration motor 1A. FIG. 3 is an exploded perspective view of the vibration motor 1A.

The vibration motor 1A includes a housing 10 defining an outer wall of the vibration motor 1A. The housing 10 is a metal box being substantially rectangular as viewed in plan. The housing 10 accommodates the components of the vibration motor 1A such as a substrate 30, a coil 40, and a vibrator 50.

The vibrator 50, which is one component of the vibration motor 1A, reciprocates inside the housing 10. More specifically, the vibrator 50 reciprocates inside the housing 10 in a direction along the long sides of the housing 10 (longitudinal direction). In other words, the vibrator 50 generates vibration in the direction along the long sides of the housing 10. The vibration motor 1A is thus a linear vibration motor that is driven horizontally to generate vibration in the direction along the long sides of the housing 10.

The direction along the long sides of the housing 10 is herein defined as a lateral direction, and the direction along the short sides of the housing 10 as a front-rear direction. The direction perpendicular to both the lateral direction and the front-rear direction is defined as a vertical direction. The vibrator 50 generates vibration in the lateral direction as defined in this manner.

In other words, the lateral direction is a direction in which the vibrator 50 reciprocates, and corresponds to a first direction in an aspect of the present invention. The front-rear direction is one of the directions perpendicular to the lateral direction, and corresponds to a second direction in an aspect of the present invention. The vertical direction is perpendicular to the front-rear direction and the lateral direction, and corresponds to a third direction in an aspect of the present invention.

Housing

Figure 4:
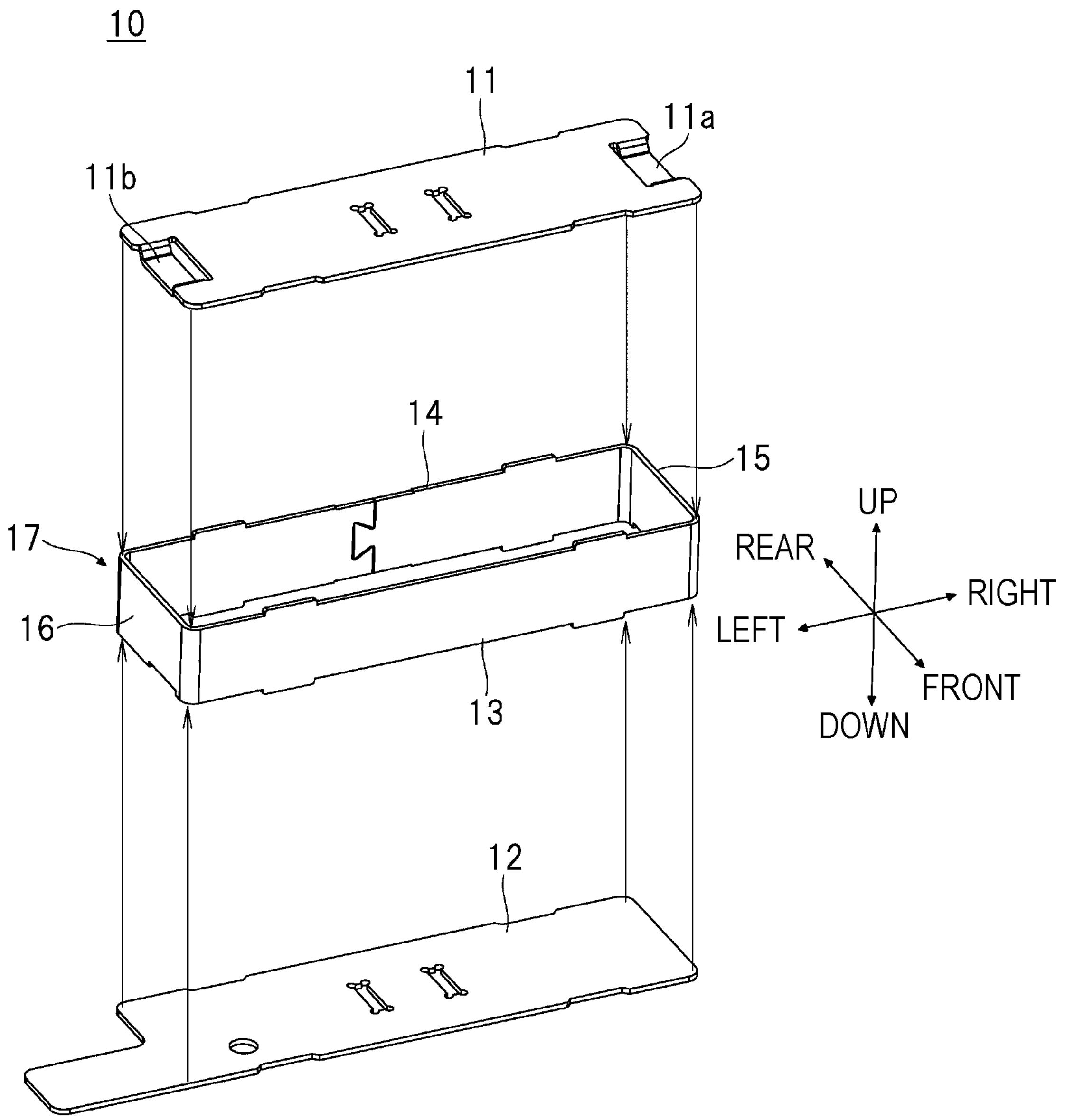
FIG. 4 is an exploded perspective view of a housing.

FIG. 4 is an exploded perspective view of the housing 10. The housing 10 includes a ceiling wall 11 and a bottom wall 12 facing each other in the vertical direction, a front wall 13 and a rear wall 14 facing each other in the front-rear direction, and a right side wall 15 and a left side wall 16 facing each other in the lateral direction. The vibrator 50 that vibrates in the direction along the long sides of the housing 10 (lateral direction) thus vibrates between the right side wall 15 and the left side wall 16 in a direction in which the right side wall 15 and the left side wall 16 face each other. The front wall 13, the rear wall 14, the right side wall 15, and the left side wall 16 may be hereafter collectively referred to as a peripheral wall 17.

The housing 10 is formed from metal plates (e.g., stainless steel plates). The ceiling wall 11, the bottom wall 12, and the peripheral wall 17 are formed from different metal plates. In other words, the housing 10 is formed from multiple metal plates joined together.

The peripheral wall 17 is formed form a strip-like metal plate with two ends joined to each other to define a rectangular space. The metal plate of the peripheral wall 17 has the two ends on the rear wall 14. More specifically, the metal plate of the peripheral wall 17 has the two ends at the middle of the rear wall 14 in the longitudinal direction (in a vibration direction). With the two ends of the metal plate joined to each other being on the rear wall 14, the vibration motor 1A can have a higher impact resistance.

For example, when the vibration motor 1A (housing 10) receives a shock from a drop, the vibrator 50 is less likely to come in contact with the two ends (a joint) of the metal plate of the peripheral wall 17. The two ends of the metal plate of the peripheral wall 17 are joined by caulking, but may be joined by welding or another joining method.

The ceiling wall 11 and the bottom wall 12 are each formed from a flat metal plate punched into a substantially rectangular shape. The ceiling wall 11 closes an opening at one end of the peripheral wall 17. The bottom wall 12 closes an opening at the other end of the peripheral wall 17. The metal plate of the ceiling wall 11 has a periphery welded to one end of the metal plate of the peripheral wall 17. The metal plate of the bottom wall 12 has a periphery welded to the other end of the metal plate of the peripheral wall 17.

The ceiling wall 11 includes a pair of restrictors 11*a* and 11*b* on its left and right portions. The restrictors 11*a* and 11*b* are located on the left and right of the vibrator 50 to restrict the reciprocation of the vibrator 50 within a predetermined range. In other words, the vibrator 50 can vibrate between the restrictor 11*a* and the restrictor 11*b*.

The vibrator 50 normally vibrates without coming in contact with the restrictor 11*a* or the restrictor 11*b*. When vibrating (moving) by a greater degree than normal in some situations, the vibrator 50 comes in contact with the restrictor 11*a* or the restrictor 11*b*. This prevents excess vibration (movement) of the vibrator 50. The bottom wall 12 may include restrictors similar to the restrictors 11*a* and 11*b*.

Substrate

Referring back to FIG. 3, the substrate 30 is a flexible printed circuit board including electrical wiring for supplying power to the coil 40 shown in FIG. 3. The substrate 30 is located on the bottom wall 12 of the housing 10. A major part of the substrate 30 is inside the housing 10, but a part of the substrate 30 extends outside the housing 10.

The major part of the substrate 30 inside the housing 10 may be hereafter referred to as a body, and the part of the substrate 30 extending outside the housing 10 may be referred to as a connector to be distinguished from each other.

The connector of the substrate 30 includes connection terminals 33 electrically connected to an input end of the electrical wiring in the body. The connector extends across one (left) short side of the housing 10 to outside the housing 10 (refer to FIGS. 1 and 2). More specifically, the connector extends between the bottom wall 12 and the left side wall 16 shown in FIG. 4 and to the left of the housing 10. The direction in which the connector extends may be changed as appropriate.

Coil

The coil 40 shown in FIGS. 2 and 3 is formed from a wire wound around a plate-like iron core. The coil 40 is connected to an output end of the electrical wiring in the body of the substrate 30. A voltage is applied to the coil 40 through the electrical wiring in response to a voltage applied to the connection terminals 33 in the substrate 30. The coil 40 can be replaced with an air-core coil.

Vibrator

The vibrator 50 includes a weight 51 and two magnet groups 52. The weight 51 is a block of a metal alloy (e.g., tungsten alloy). The weight 51 is surrounded by the peripheral wall 17 of the housing 10. The weight 51 has a side surface 53 facing the peripheral wall 17. The weight 51 further has an upper surface 54 that connects with one periphery of the side surface 53 and a lower surface 55 that connects with the other periphery of the side surface 53.

The weight 51 has, in its center, a magnet compartment 56 extending through the weight 51 in the vertical direction. The magnet compartment 56 accommodates the magnet groups 52. Each magnet group 52 includes three plate-like permanent magnets arranged in the lateral direction.

The two magnet groups 52 face each other with the coil 40 between them in the front-rear direction in the magnet compartment 56. A back yoke 57 is located behind each magnet group 52. Pole pieces 58 are located on both ends of the coil 40 in the axial direction of the coil 40.

In response to a voltage applied to the coil 40 through the electrical wiring in the substrate 30, the coil 40 is magnetized, generating a magnetic flux. The magnetic flux generated around the coil 40 and magnetic fluxes generated around the magnet groups 52 then magnetically interact with one another, thus causing the vibrator 50 including the weight 51 and the magnet groups 52 to reciprocate (vibrate) in the lateral direction.

Elastic Member

The vibrator 50 is supported by a pair of elastic members 60 to allow reciprocation. For ease of explanation, the elastic member 60 adjacent to one end (right end) of the vibrator 50 in the lateral direction may be hereafter referred to as an elastic member 61, and the elastic member 60 adjacent to the other end (left end) of the vibrator 50 in the lateral direction may be referred to as an elastic member 62 to be distinguished from each other.

Figure 5:
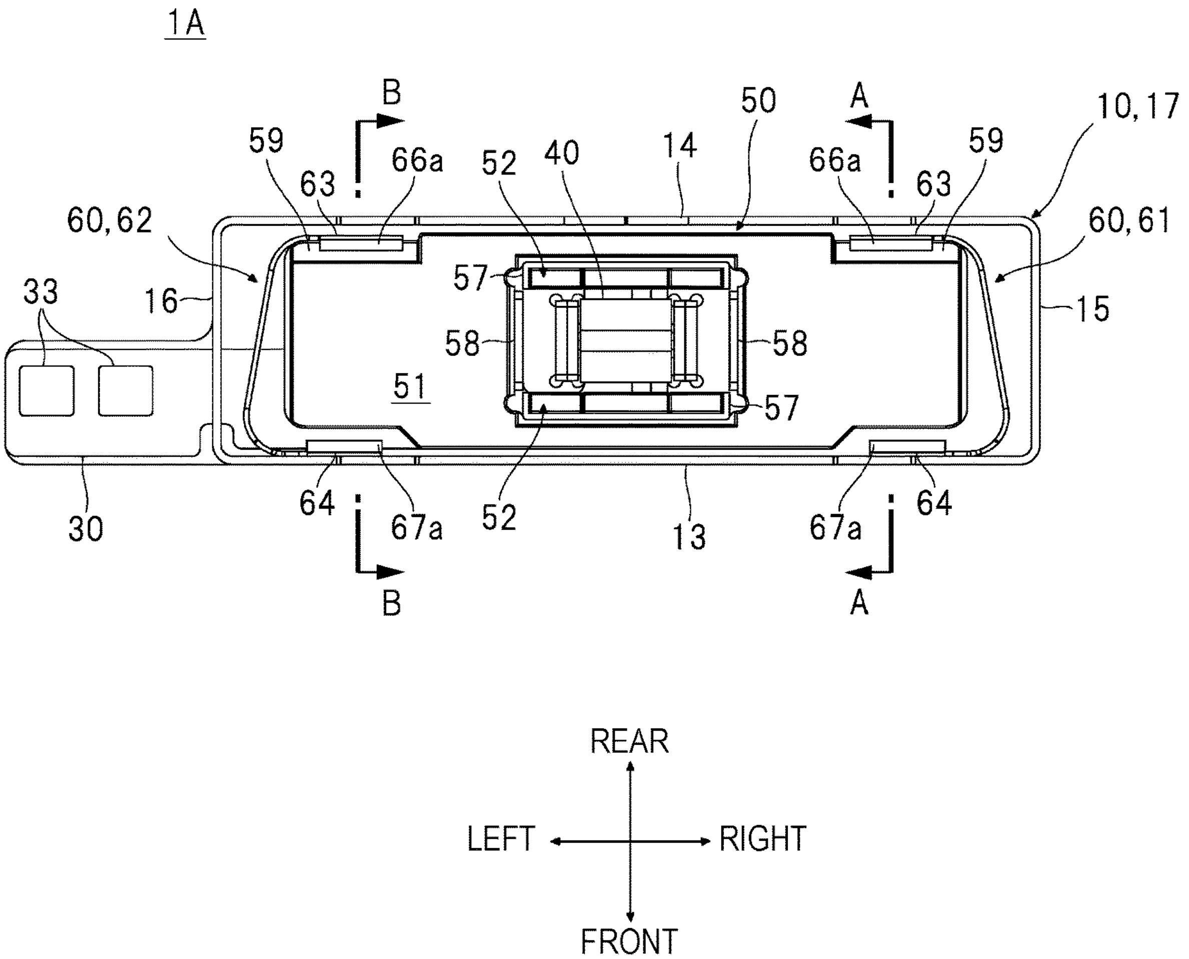
FIG. 5 is a plan view of elastic members supporting a vibrator.
Figure 6A:
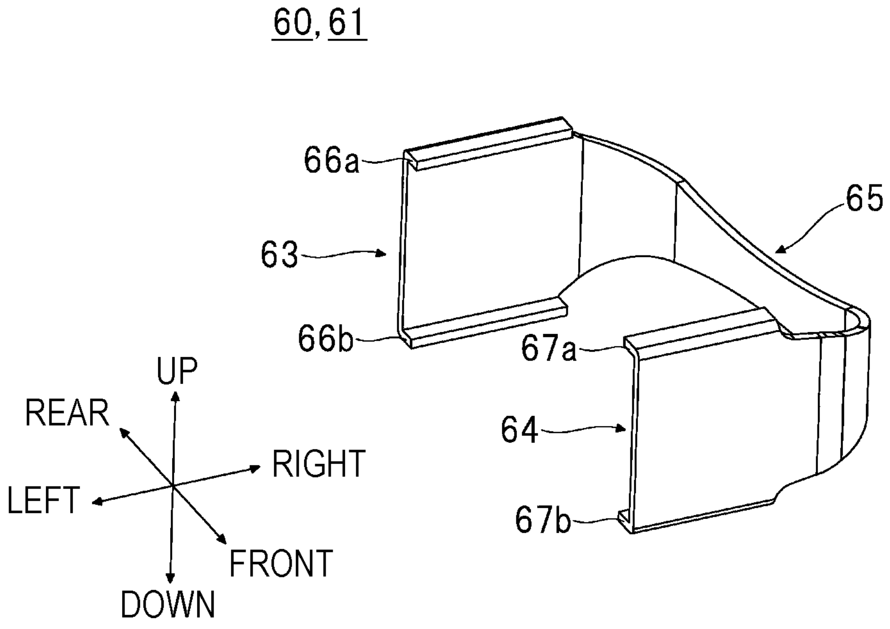
FIG. 6A is an enlarged perspective view of one of the elastic members.
Figure 6B:
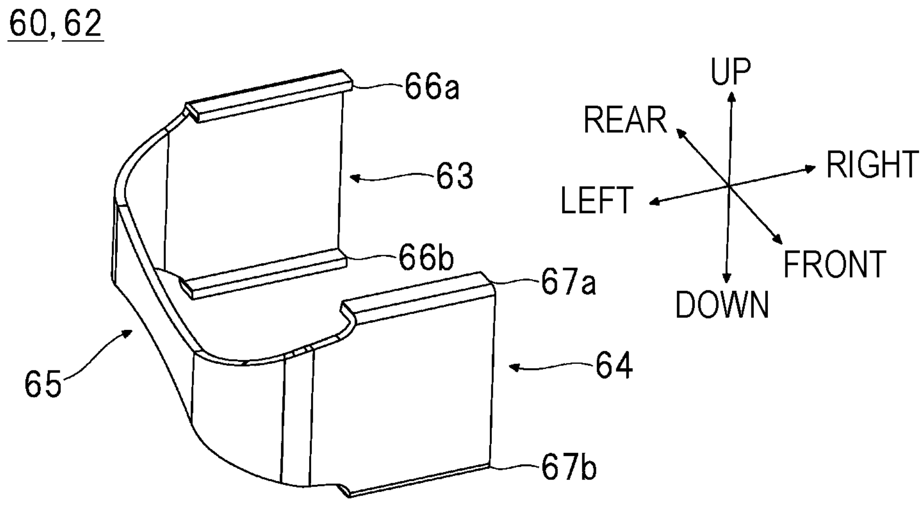
FIG. 6B is an enlarged perspective view of the other of the elastic members.

FIG. 5 is a plan view of the elastic members 60 supporting the vibrator 50. FIG. 6A is an enlarged perspective view of the elastic member 61. FIG. 6B is an enlarged perspective view of the elastic member 62.

Each elastic member 60 is a metal plate with a thickness less than or equal to 1.0 mm. In other words, each elastic member 60 is a leaf spring with a thickness less than or equal to 1.0 mm. The metal plate as the elastic member 60 may have a thickness greater than 1.0 mm. The material for the metal plate is not limited to a specific material.

Each elastic member 60 includes a first fixture 63 at one end and a second fixture 64 at the other end. The first fixture 63 and the second fixture 64 connect with each other with an intermediate portion 65 between them.

The first fixture 63, the second fixture 64, and the intermediate portion 65 are distinguished from one another for ease of explanation. In other words, the first fixture 63 is a part of a single metal plate, the second fixture 64 is another part of the single metal plate, and the intermediate portion 65 is still another part of the single metal plate.

The first fixture 63 and the second fixture 64 are bent at right angles or substantially right angles in the same direction with respect to the intermediate portion 65 and face each other in the front-rear direction. The elastic member 60 is thus substantially U-shaped as viewed in plan.

The intermediate portion 65 of the elastic member 60 is thinner inward from its two longitudinal outer ends. In other words, the intermediate portion 65 has a vertical dimension (width) that gradually narrows inward from its two longitudinal outer ends.

The first fixture 63 includes a pair of bends 66*a* and 66*b* extending in one of two opposite directions of the front-rear direction (frontward). The second fixture 64 includes a pair of bends 67*a* and 67*b* extending in the other of two opposite directions of the front-rear direction (rearward).

In other words, the first fixture 63 includes the pair of bends 66*a* and 66*b* bent inward, and the second fixture 64 also includes the pair of bends 67*a* and 67*b* bent inward.

The bend 66*a* and the bend 66*b* in the first fixture 63 are bent inward at 90 degrees. The bend 66*a* and the bend 66*b* thus face (directly face) each other in the vertical direction. Similarly, the bend 67*a* and the bend 67*b* in the second fixture 64 are bent inward at 90 degrees. The bend 67*a* and the bend 67*b* thus face (directly face) each other in the vertical direction.

As described above, the elastic members 61 and 62 have the same shape and structure. Further, the elastic members 61 and 62 both include the first fixtures 63 fixed to the weight 51 in the vibrator 50 and the second fixtures 64 fixed to the peripheral wall 17 of the housing 10.

The first fixture 63 in the elastic member 61 is welded to a right portion of the weight 51, whereas the first fixture 63 in the elastic member 62 is welded to a left portion of the weight 51. More specifically, the first fixture 63 in the elastic member 61 is welded to a right portion of the rear surface of the weight 51 facing the rear wall 14 of the housing 10. The first fixture 63 in the elastic member 62 is welded to a left portion of the rear surface of the weight 51 facing the rear wall 14 of the housing 10. The second fixture 64 in the elastic member 61 is welded to a right portion of the inner surface of the front wall 13 of the housing 10, whereas the second fixture 64 in the elastic member 62 is welded to a left portion of the inner surface of the front wall 13 of housing 10.

Figure 7:
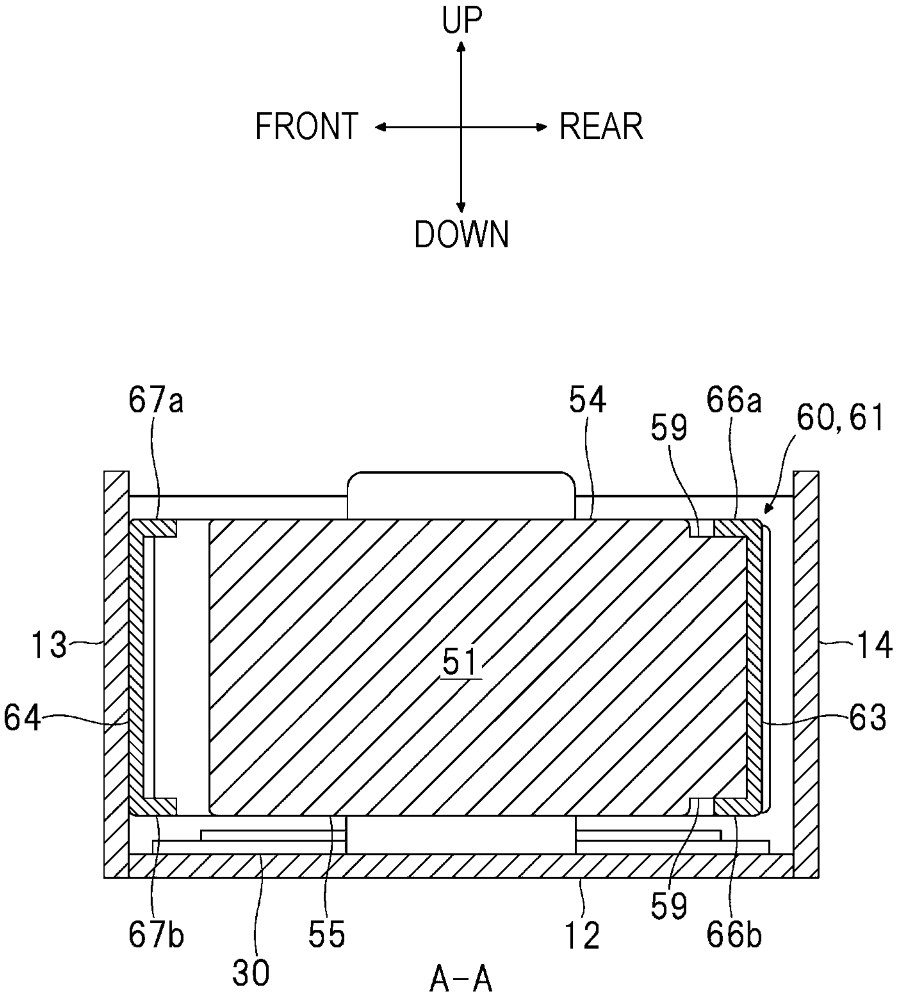
FIG. 7 is an enlarged cross-sectional view taken along line A-A in FIG. 5.
Figure 8:
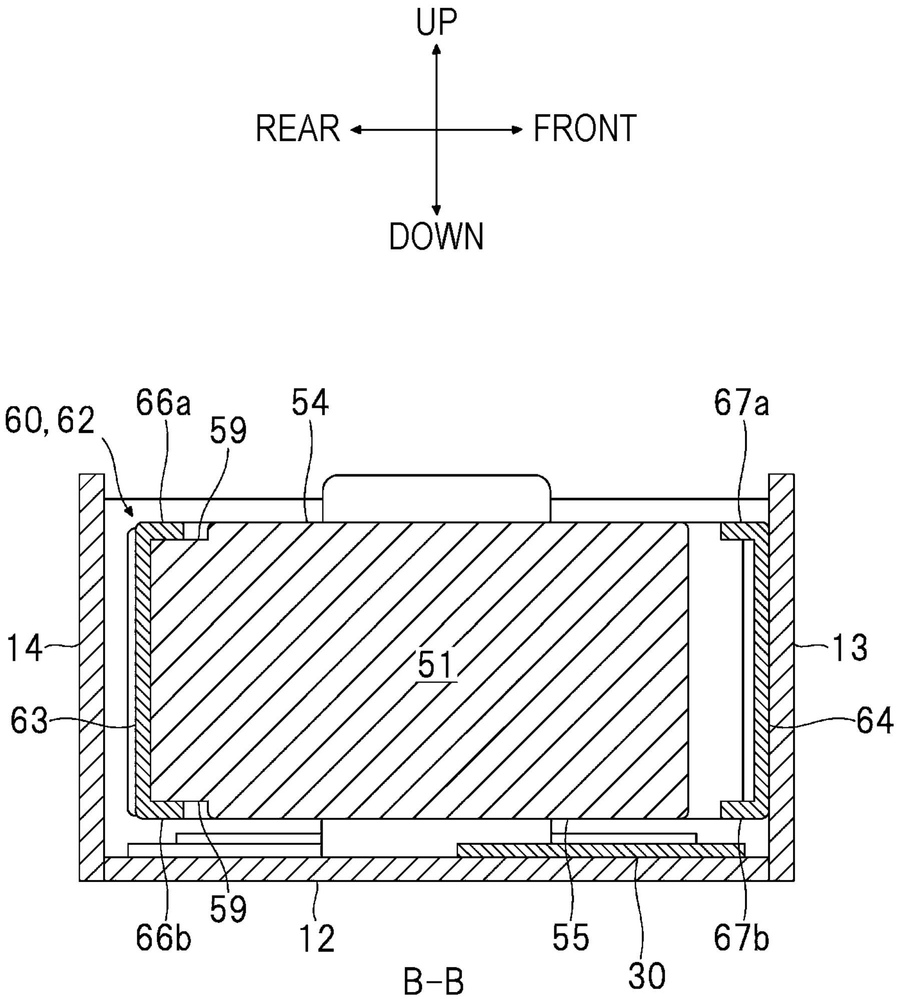
FIG. 8 is an enlarged cross-sectional view taken along line B-B in FIG. 5.

FIG. 7 is an enlarged cross-sectional view taken along line A-A in FIG. 5. FIG. 8 is an enlarged cross-sectional view taken along line B-B in FIG. 5.

As shown in FIG. 7, the pair of bends 66*a* and 66*b* in the first fixture 63 in the elastic member 61 face each other in the vertical direction with the weight 51 between them. As shown in FIG. 8, the pair of bends 66*a* and 66*b* in the first fixture 63 in the elastic member 62 also face each other in the vertical direction with the weight 51 between them.

As described above, each first fixture 63 is fixed to the weight 51 by welding. However, the bends 66*a* and 66*b*, which are parts of the first fixture 63, are not welded to the weight 51. In other words, each first fixture 63 has a part other than the bends 66*a* and 66*b* (a part facing the rear surface of the weight 51) welded to the weight 51.

The weight 51 has, on the upper surface 54 and the lower surface 55, recesses 59 that are stepped to be lower than other portions of the upper surface 54 and the lower surface 55. The bends 66*a* are located on the bottom surfaces of the recesses 59 on the upper surface 54 of the weight 51. The bends 66*b* are located on the bottom surfaces of the recesses 59 on the lower surface 55 of the weight 51.

This allows the bends 66*a* to have their upper surfaces flush or substantially flush with the upper surface 54 of the weight 51 and the bends 66*b* to have their lower surfaces flush or substantially flush with the lower surface 55 of the weight 51. In other words, the bends 66*a* and 66*b* have their thicknesses accommodated by the recesses 59. The bends 66*a* and 66*b* thus do not increase the vertical dimension (height or thickness) of the housing 10.

In the present embodiment, the first fixtures 63 in the elastic members 60 fixed to the vibrator 50 include the bends 66*a* and 66*b* extending in a direction perpendicular to the vibration direction of the vibrator 50 (lateral direction). The second fixtures 64 in the elastic members 60 fixed to the housing 10 also include the bends 67*a* and 67*b* extending in the direction perpendicular to the vibration direction of the vibrator 50 (lateral direction).

This structure distributes stress generated in the elastic members 60 as the vibrator 50 moves. More specifically, this structure reduces stress concentration at or near the basal ends of the first fixtures 63 and the second fixtures 64. This reduces or prevents breakage or deformation of the elastic members 60 when the vibrator 50 moves by a greater degree than normal.

The elastic members 60 in the present embodiment are thus more durable than other elastic members with no bend 66*a* or 66*b* or no bend 67*a* or 67*b*. No reinforcement member or no restriction member may thus be used to improve the durability of the elastic members 60, reducing the number of components and the number of work-hours in assembly.

The present invention is not limited to the above embodiment, but may be modified variously without departing from the spirit and scope of the invention. For example, at least one of the first fixtures 63 or the second fixtures 64 may include the bends to distribute stress generated in the elastic members 60. This can reduce or prevent breakage or deformation of the elastic members 60.

In other words, either the bends 66*a* and 66*b* or the bends 67*a* and 67*b* may be eliminated. To reduce or prevent breakage or deformation of the elastic members 60 more reliably, the first fixtures 63 fixed to the vibrator 50 may include bends. The second fixtures 64 including no bend may include a reinforcing plate.

The bends 66*a* and 66*b* and the bends 67*a* and 67*b* may extend in a direction opposite to the direction in the above embodiment. For example, the bends 66*a* and 66*b* may extend rearward, and the bends 67*a* and 67*b* may extend frontward.

The bends 66*a* and 66*b* and the bends 67*a* and 67*b* may not be bent at 90 degrees, and may be bent at an angle greater than 90 degrees or less than 90 degrees. When the angle at which the bends 66*a* and 66*b* and the bends 67*a* and 67*b* are bent is not limited to 90 degrees, the target accuracy of bending can be reduced, thus facilitating the processing and the assembly.

The bends 66*a* and 66*b* and the bends 67*a* and 67*b* may be bent at the same angle or at different angles. For example, one of the bends 66*a* and 66*b* or the bends 67*a* and 67*b* may be bent at an angle greater than or equal to 90 degrees, and the other of the bends 66*a* and 66*b* or the bends 67*a* and 67*b* may be bent at an angle less than 90 degrees.

The bends 66*a* and 66*b* and the bends 67*a* and 67*b* bent inward at 90 degrees can prevent the housing 10 from being larger, and can thus prevent the vibration motor 1A from being larger. The bends 66*a* and 66*b* bent at an angle less than 90 degrees allows the weight 51 to be placed between the bends 66*a* and 66*b* more easily. This may improve the workability in assembly.

Figure 9:
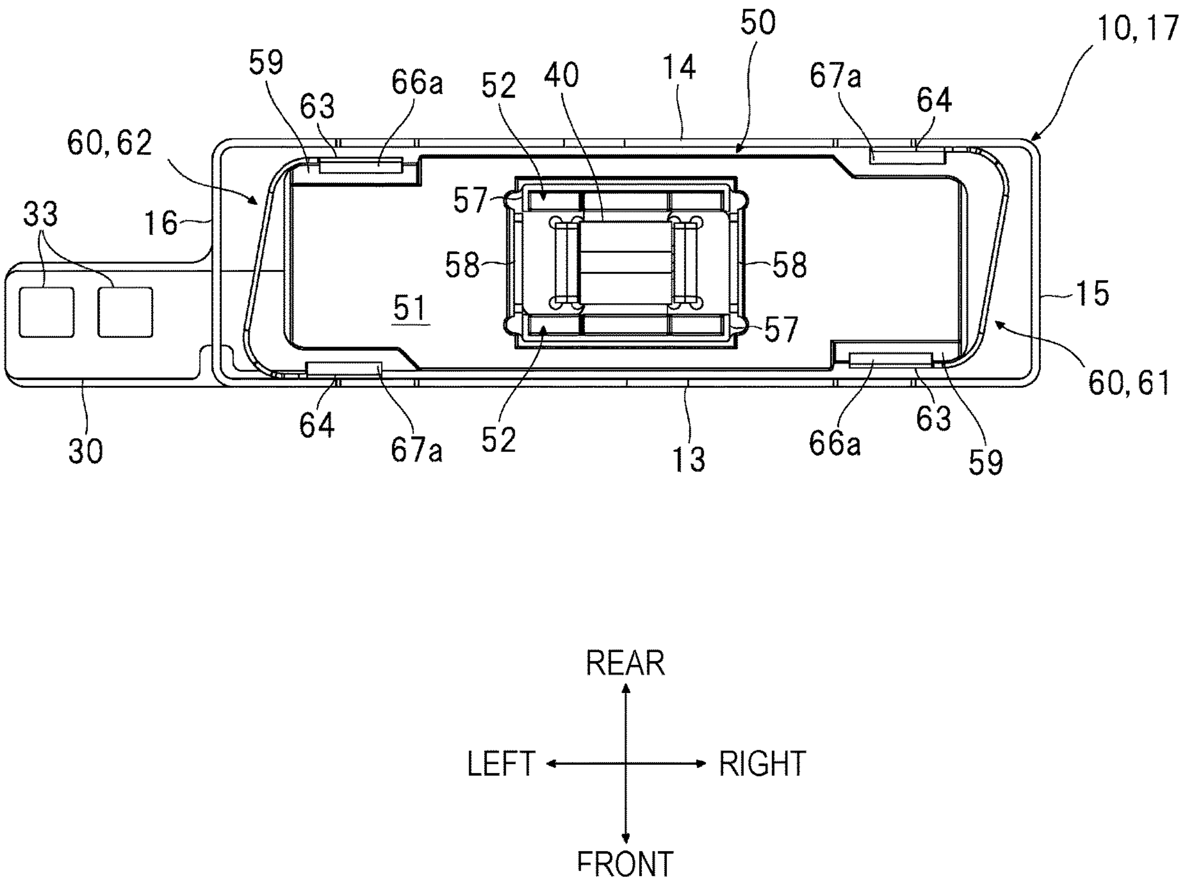
FIG. 9 is a plan view of the elastic members, showing their arrangement in a modification.

One of the elastic member 61 or the elastic member 62 may be inverted. FIG. 9 is a plan view of the elastic members 61 and 62, showing their arrangement in a modification. The elastic member 61 shown in FIG. 9 is rotated by 180 degrees relative to the elastic member 61 shown in FIG. 5. In this case, the first fixture 63 in the elastic member 61 is welded to a right portion of the front surface of the weight 51 facing the front wall 13 of the housing 10, and the second fixture 64 is welded to a right portion of the inner surface of the rear wall 14 of the housing 10.

The vibration motor according to one or more embodiments of the present invention may have the structures described below.

(1) A vibration motor, comprising:

a housing;

a vibrator accommodated in the housing, the vibrator being configured to reciprocate in a first direction inside the housing; and a pair of elastic members supporting the vibrator inside the housing to allow reciprocation of the vibrator in the first direction, wherein each of the pair of elastic members is a metal plate including a first fixture fixed to the vibrator, a second fixture fixed to the housing, and an intermediate portion connecting the first fixture and the second fixture, the first fixture and the second fixture are bent in a same direction with respect to the intermediate portion and face each other in a second direction perpendicular to the first direction, at least one of the first fixture or the second fixture includes a pair of bends extending in one of two opposite directions of the second direction, and the pair of bends face each other in a third direction perpendicular to the first direction and the second direction.

(2) The vibration motor according to (1), wherein each of the first fixture and the second fixture includes the pair of bends, and the pair of bends included in the first fixture face each other with the vibrator between the pair of bends.

(3) The vibration motor according to (1) or (2), wherein one of the pair of elastic members is located at an end of the vibrator in the first direction, and the other of the pair of elastic members is located at another end of the vibrator in the first direction.

(4) The vibration motor according to any one of (1) to (3), wherein the first fixture in each of the pair of elastic members is welded to a weight included in the vibrator, and the second fixture in each of the pair of elastic members is welded to the housing.

(5) The vibration motor according to (4), wherein the second fixture in each of the pair of elastic members is welded to a peripheral wall of the housing surrounding the weight, the first fixture in each of the pair of elastic members is welded to a side surface of the weight facing the peripheral wall of the housing, one of the pair of bends included in the first fixture in each of the pair of elastic members is on a lower surface of the weight connecting with the side surface of the weight, and the other of the pair of bends included in the first fixture in each of the pair of elastic members is on an upper surface of the weight connecting with the side surface of the weight.

What is claimed is:

1. A vibration motor, comprising:

a housing;

a vibrator accommodated in the housing, the vibrator being configured to reciprocate in a first direction inside the housing; and a pair of elastic members supporting the vibrator inside the housing to allow reciprocation of the vibrator in the first direction, wherein each of the pair of elastic members is a metal plate including a first fixture fixed to the vibrator, a second fixture fixed to the housing, and an intermediate portion connecting the first fixture and the second fixture, the first fixture and the second fixture are bent in a same direction with respect to the intermediate portion and face each other in a second direction perpendicular to the first direction, each of the first fixture and the second fixture includes a pair of bends extending in one of two opposite directions of the second direction, the pair of bends included in the first fixture face each other with the vibrator between the pair of bends, and the pair of bends face each other in a third direction perpendicular to the first direction and the second direction.

2. The vibration motor according to claim 1, wherein one of the pair of elastic members is located at an end of the vibrator in the first direction, and the other of the pair of elastic members is located at another end of the vibrator in the first direction.

3. The vibration motor according to claim 2, wherein the first fixture in each of the pair of elastic members is welded to a weight included in the vibrator, and the second fixture in each of the pair of elastic members is welded to the housing.

4. The vibration motor according to claim 3, wherein the second fixture in each of the pair of elastic members is welded to a peripheral wall of the housing surrounding the weight, the first fixture in each of the pair of elastic members is welded to a side surface of the weight facing the peripheral wall of the housing, one of the pair of bends included in the first fixture in each of the pair of elastic members is on a lower surface of the weight connecting with the side surface of the weight, and the other of the pair of bends included in the first fixture in each of the pair of elastic members is on an upper surface of the weight connecting with the side surface of the weight.

* * * * *